(12) United States Patent
Fukuhara et al.

(10) Patent No.: US 6,205,087 B1
(45) Date of Patent: Mar. 20, 2001

(54) SONIC DATA LOGGING SYSTEM

(75) Inventors: Masafumi Fukuhara, Sagamihara (JP); Mauricio Tejada, Stafford, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 09/117,514
(22) PCT Filed: Jan. 31, 1997
(86) PCT No.: PCT/IB97/00153
  § 371 Date: Nov. 16, 1998
  § 102(e) Date: Nov. 16, 1998
(87) PCT Pub. No.: WO97/28464
  PCT Pub. Date: Aug. 7, 1997

(30) Foreign Application Priority Data

Jan. 31, 1996 (JP) ........................... 8-015645

(51) Int. Cl.$^7$ ................................. G01V 1/00
(52) U.S. Cl. ..................... 367/69; 367/30; 367/32
(58) Field of Search ................. 367/26, 27, 25, 367/34, 30, 31, 43, 45, 69, 33, 86, 32; 181/102

(56) References Cited

U.S. PATENT DOCUMENTS

| | | | |
|---|---|---|---|
| 4,524,433 | * | 6/1985 | Brodine ................. 367/25 |
| 4,985,873 | * | 1/1991 | Eyl et al. .............. 367/27 |
| 5,058,078 | * | 10/1991 | Eyle et al. ............ 367/26 |
| 5,130,950 | * | 7/1992 | Orban et al. .......... 367/34 |
| 5,317,111 | * | 5/1994 | Orban et al. ......... 181/105 |
| 5,594,706 | * | 1/1997 | Shenoy et al. ........ 367/76 |

* cited by examiner

Primary Examiner—Christine Oda
Assistant Examiner—Anthony Jolly
(74) Attorney, Agent, or Firm—Steven L. Christian (57) ABSTRACT

A sonic logging method involves the pre-processing of a detection signal by a downhole processing device to determine the arrival time of a sonic signal at a receiver which is then transmitted to the surface. A suitable sonic logging downhole tool includes a control device for controlling generation and reception of the sonic signal, an A-D converter for digitizing the detected signal at a predetermined sampling interval, a first memory for storing the digitized waveform, a second memory for storing a program for processing the digitized waveform, and a microprocessor capable of executing the stored program so as to determine an arrival time of the sonic signal arriving at the receiver.

18 Claims, 10 Drawing Sheets

SONIC DATA LOGGING SYSTEM

DETAILED DESCRIPTION OF THE INVENTION

1. Field of the Invention

The present invention relates to logging technology for measuring physical properties of underground formations, and, in particular, to a logging method and system using sonic waves.

2. Background

In order to explore underground resources, such as those providing oil and natural gas, use has conventionally been made of logging technology by drilling a borehole into the ground, locating a measuring device called a downhole tool or sonde inside the borehole so that is can be moved up and down, and processing a measured signal from the downhole tool with processing apparatus located at the surface and connected to the downhole tool through a logging cable. In addition, sonic logging involving determining the speed of sound propagating through the underground formation using a sonic wave generator and a receiver provided on the downhole tool is also well known. For example, reference should be made to Jay Tittaman, "Geophysical Well Logging", Academic Press, Inc., and "Illustration Physical Exploration", 1989, Physical Exploration Society.

In conventional sonic logging a sonic wave in the form of a pulse is output by a sonic generator and transmitted into the ground, and the sonic wave propagating through the ground is detected by a receiver and, as an analog waveform, transmitted through a logging cable to the ground surface processing apparatus which processes the analog waveform to determine the arrival time of the sonic wave at the receiver. However, because of the unreliability of analog data received after transmission along a lengthy logging cable, a proposal has recently been made to convert the analog signal into a digital signal at the downhole tool, and then to transmit this digital signal to the ground surface processing apparatus for the required processing (see, for example, A. R. Harrison, C. J. Randal, J. B. Aron, C. F. Morris, A. H. Wingnall, R. A. Dwoorak, L. L. Rulledge, and J. L. Perkins, "Acquisition and Analysis of Sonic Waveforms From a Borehole Monopole and Dipole Source for the Determination of Compression and Shear Speeds and Their Relation to Rock Mechanical Properties and Surface Seismic Data", SPE 20557, 1990, September 23–26, New Orleans, SPE 65th Annual Technical Conference and Exhibition). However, in the above-identified literature (SPE 20557), as shown in its FIGS. 3 and 4, the whole of the digital signal exceeding a pre-set threshold value is transmitted to the ground surface processing apparatus for analysis thereby. This requires the transmission of an exorbitant amount of digital data to the surface, and a broad bandwidth is required for the telemetry. In addition, since even that data which is not necessarily required for sonic logging analysis is also transmitted, the efficiently of the operation is rather poor. And, since a large amount of digital data is transmitted through a lengthy logging cable, there is also a chance of errors in transmission.

Tasks to be solved by the Invention

The present invention, made in view of the points raised above, suggests a sonic logging method and system capable of obviating the drawbacks of the prior art as described above. To achieve this it proposes ways of minimising the amount of digital data to be transmitted to the ground surface processing apparatus, reducing the bandwidth necessary for the telemetry, and reducing also the possibility of data errors, thereby enhancing the system's reliability.

SUMMARY OF THE INVENTION

In accordance with one aspect of the present invention, therefore, there is provided a sonic logging method for determining characteristics of the formations through which a borehole passes, which method uses a downhole tool which is moveably locatable up and down inside the borehole and which is coupled to ground surface processing apparatus through a logging cable, which tool is provided with at least one sonic wave generator and at least one receiver spaced apart from each other and also with a downhole processing device operative coupled to said generator and said receiver and also to said ground surface processing apparatus through said logging cable, in which method the downhole tool is first suitably located in the borehole, and then the sonic wave generator is caused to generate, and subsequently, receive a sonic wave, which method is characterised by including the steps of:

(1) processing a detection signal from the receiver by the downhole processing device thereby to determine an arrival time of the sonic wave at its receiver; and (2) transmitting the arrival time thus determined to the ground surface processing apparatus through the logging cable.

In accordance with another aspect of the present invention, there is provided a sonic logging downhole tool, for use in a borehole characteristic determination method, which tool includes:

at least one sonic wave generator; and at leas tone receiver capable of receiving the sonic wave after the wave has travelled through a borehole ground formation or casing;

which tool is characterised by including a control device for controlling the generation and reception of the sonic wave, the control device comprising:

an analog-to-digital converter for digitising a detection signal from the receiver at a predetermined sampling interval;

a first memory for storing a waveform thus digitised;

a second memory for storing a predetermined program for processing the thus-stored digitised waveform; and a microprocessor capable of executing the program stored in the second memory, thereby in operation processing the digitised waveform stored in the first memory to determine an arrival time of a sonic wave generated from the generator and arriving at the receiver.

In accordance with a further aspect of the present invention, there is provided a sonic logging system which comprises the centralisation of ground surface processing apparatus and a sonic logging downhole tool of the invention as just defined.

In sonic logging, use is commonly made of a sonic waveform having a central frequency of 15 kHz and a wavelength of 2.5 m. On digitisation this, in the case of a 16 bit resolution, leads to 250×16 bits—4 kilobits. In conventional digital sonic logging this amount of digital data is transmitted to a ground surface processing apparatus through a logging cable by way of telemetry communication, and the processing to determine the arrival time and amplitude of the P (compression) wave is carried out by the ground surface processing apparatus. However, what is actually required in sonic logging is basically only the arrival time and amplitude of the P wave—rarely if ever is the remaining digital waveform data needed. Thus, the data which is actually necessary—the two times—comprises on digitisation a mere 2×16 bits=32 bits. So, as may be understood from this simple example, if the processing of the digitised waveform is carried out in the downhole tool itself, and only the resulting arrival time and amplitude are transmitted to the ground surface processing apparatus, the amount of data to be transmitted through the logging cable can be reduced to one hundredth or less, and as a result the transmission efficiency is significantly improved, and the occurrence of error is also significantly reduced. In addition, the logging cable has an increased idle time, so that the logging cable can be used for some other purpose. The present invention has been made principally in view of these points.

Incidentally, although in accordance with the present invention, the primary object is to determine downhole the sonic signal arrival time and/or amplitude and then transmitting the result to the surface, it is of course also possible in the present invention—and in certain cases it is actually preferred—to transmit not all by only a selected portion of the digital signal up to the ground surface processing apparatus. As explained in more detail hereinafter, such a selective transmission of digital signal has the advantage of allowing the confirmation of the data's reliability (by carrying out reprocessing with the ground surface processing apparatus).

An embodiment of the invention is now described, though by way of illustration only, with reference to the accompanying Drawings.

BRIEF DESCRIPTION OF THE DRAWINGS

FIG. 2 (1) and (2) are schematic illustrations showing the arrangement of sonic transmitter and receivers in a sonic logging downhole tool of the present invention.

FIG. 5 (a) and (b) are illustrations showing the digital waveforms for open and casing type boreholes, respectively.

FIG. 6 (a) and (b) are illustrations showing a threshold detection method in analog and digital sonic logging, respectively.

FIG. 7 (a) and (b) are illustrations showing the D.C. offset measuring time period and the noise measuring time period, respectively.

FIG. 10 (a), (b) and (c) are illustrations showing the process for carrying out the high threshold detection utilizing interpolation processing.

EXPLANATION OF NUMERALS

1: Downhole Tool
2: Logging Cable
3: Ground Surface Processing Apparatus
4: Borehole
8: Downhole Processing Unit
12c: ADC Converter
13a: Digital Signal Processor
13c: Telemetry Interface
13d: Program Memory
Tt: Arrival Time
$T_0$: Sonic Wave Firing Time
Td; Detection Start Time
Tp: Previous Arrival Time
$T_{HT}$: High Threshold Arrival Time
$T_{LT}$: Low Threshold Arrival Time
E1: First Peak
E2: Second Peak

MODES EMBODYING THE INVENTION

Figure 1:
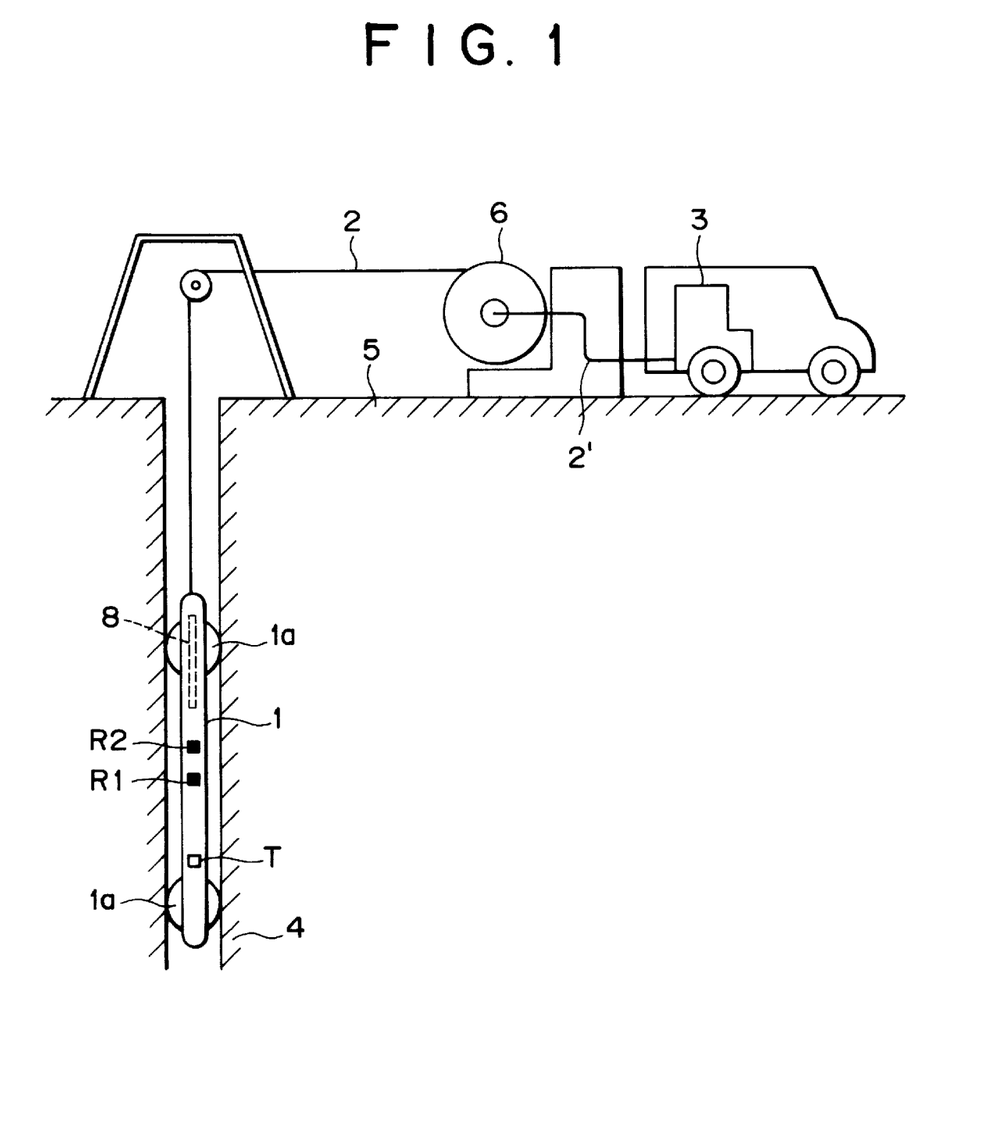
FIG. 1 A schematic illustration showing a sonic logging system constructed on the basis of one embodiment of the present invention.
Figure 2A:
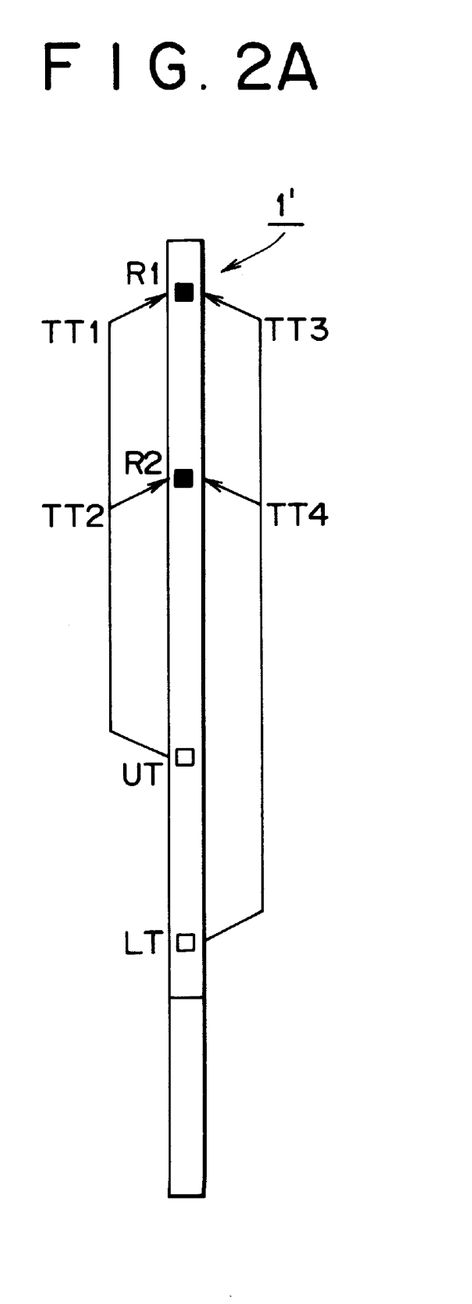
Figure 2B:
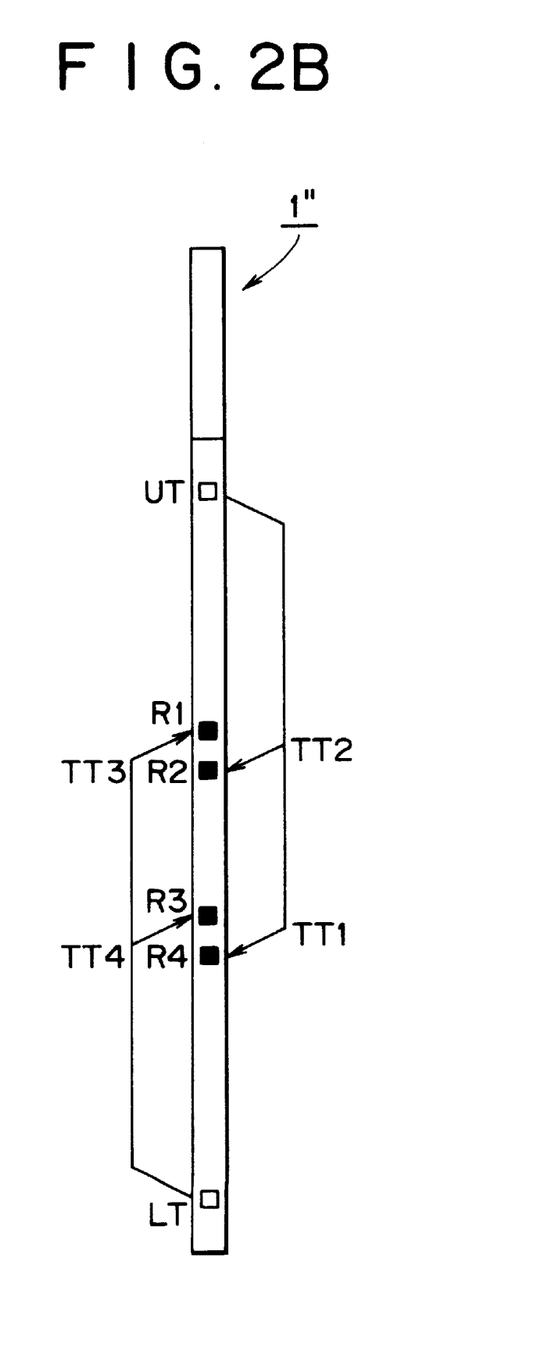

FIG. 1 is a schematic illustration showing a sonic logging system constructed in accordance with one embodiment of the present invention. As shown in FIG. 1, the present sonic logging system includes a downhole tool (also called sonde) 1 movable up and down within a borehole 4 drilled into the ground. The downhole tool 1 is elongated in shape and on an outer peripheral surface of its housing are mounted a sonic transmitter T and a pair of receivers R1 and R2 spaced apart from each other over a predetermined distance in a vertical direction and also spaced apart from the transmitter T over a predetermined distance in the vertical direction. Inside the housing of downhole tool 1 is sealingly provided a downhole processing unit 8. An example of a specific structure of downhole processing unit 8 will be described in detail later with reference to FIG. 3. The downhole processing unit 8 is connected to the sonic transmitter T and receivers R1 and R2 through internal interconnections (not shown) and a sonic wave in the form of a pulse is emitted into the underground formation from the sonic transmitter T in accordance with an instruction from the downhole processing unit 8. The sonic wave propagates through the underground formation along the borehole 4 in the vertical direction and is received by receivers R1 and R2, respectively, so that respective detection signals from the receivers R1 and R2 are supplied to the downhole processing unit 8. In this manner, if respective arrival times T1 and T2 of the sonic wave at respective receivers R1 and R2 after having been emitted from the sonic transmitter T and propagated through the underground formation are detected and a difference between these arrival times, i.e., ΔT=T1−T2, is calculated, then the propagation time of the sonic wave which has propagated through the underground formation over the vertical distance between the pair of receives R1 and R2 can be calculated. Accordingly, from this vertical distance and the propagation time, the speed of the sonic wave which has propagated through the underground formation can be calculated. And, since the propagation time of a sonic wave is associated with the structure of underground formation, it is possible to analyze such a structure.

It is to be noted that the borehole 4 shown in FIG. 1 is a so-called "bare borehole" so that the wall of borehole 4 is formed by the underground formation. In this case, as described above, since the sonic wave which has propagated through the underground formation is detected, it is possible to analyze mainly the structure of the underground formation. On the other hand, use may be made of a cased borehole in which case a cylindrical casing is fitted along the wall surface of borehole 4. If a casing is present, since th sonic wave propagates through the casing, the sonic wave which first arrives at a receiver is the one which has propagated through the casing. In this case, by measuring the amplitude of first P wave, the cementing between the casing and the underground formation, the connecting condition between segments of the casing or the like can be evaluated. In the sonic logging, in particular, since the downhole tool 1 is desired to be located at the center of borehole 4, in the embodiment shown in FIG. 1, centering members 1*a*, 1*a* are provided at appropriate top and bottom locations of downhole tool 1. It is to be noted that in the case of moving the downhole tool 1 up and down along the borehole 4, the centering members 1*a* are preferably set in their retracted positions.

The top portion of downhole tool 1 is connected to a logging cable 2 so that the downhole tool 1 is suspended by the logging cable 2. The logging cable 2 not only holds the downhole tool 1 in a suspended condition mechanically, but also includes transmission lines (now shown) so as to allow to transmit signals electrically or optically to and from the downhole processing unit 8. The logging cable 2 is wound around a drum 6 located at a ground surface 5 and is connected to an extension logging cable 2' at a center shaft of the drum 6. And, the extension logging cable 2' is connected to a ground surface processing apparatus 3, which is typically comprised of a computer system.

FIG. 2 illustrates a few examples of an arrangement of sonic transmitters and receivers of a downhole tool constructed in accordance with another embodiment of the present invention. That is, in the embodiment shown in FIG. 1, provision is made of a single sonic transmitter T and a pair of receivers r1 and r2, whereas in a downhole tool 1' of FIG. 2(1), provision is made of a pair of sonic transmitters UT and LT and a pair of receivers R1 and R2. In this case, a sonic wave emitted from the upper sonic transmitter UT arrives at the pair of receivers R1 and R2 at arrival times TT1 and TT2, respectively, and, on the other hand, a sonic wave emitted from the lower sonic transmitter LT arrives at the pair of receivers R1 and R2 at arrival times TT3 and TT4, respectively. On the other hand, in a downhole tool 1" of FIG. 2(2), two pairs of receivers R1 and R3 and R2 and R4 arranged between a pair of sonic transmitters UT and LT, in which a sonic wave from the upper sonic transmitter UT arrives at the pair of receivers R2 and R4 at arrival times TT2 and TT1, respectively, whereas, a sonic wave from the lower sonic transmitter LT arrives at the other pair of receivers R1 and R3 at arrival times TT3 and TT4, respectively. In this manner, by providing a structure in which sonic waves from separate sonic transmitters are detected at the same formation location, the reliability of data can be increased and a detailed analysis of an underground formation can be made.

Figure 3:
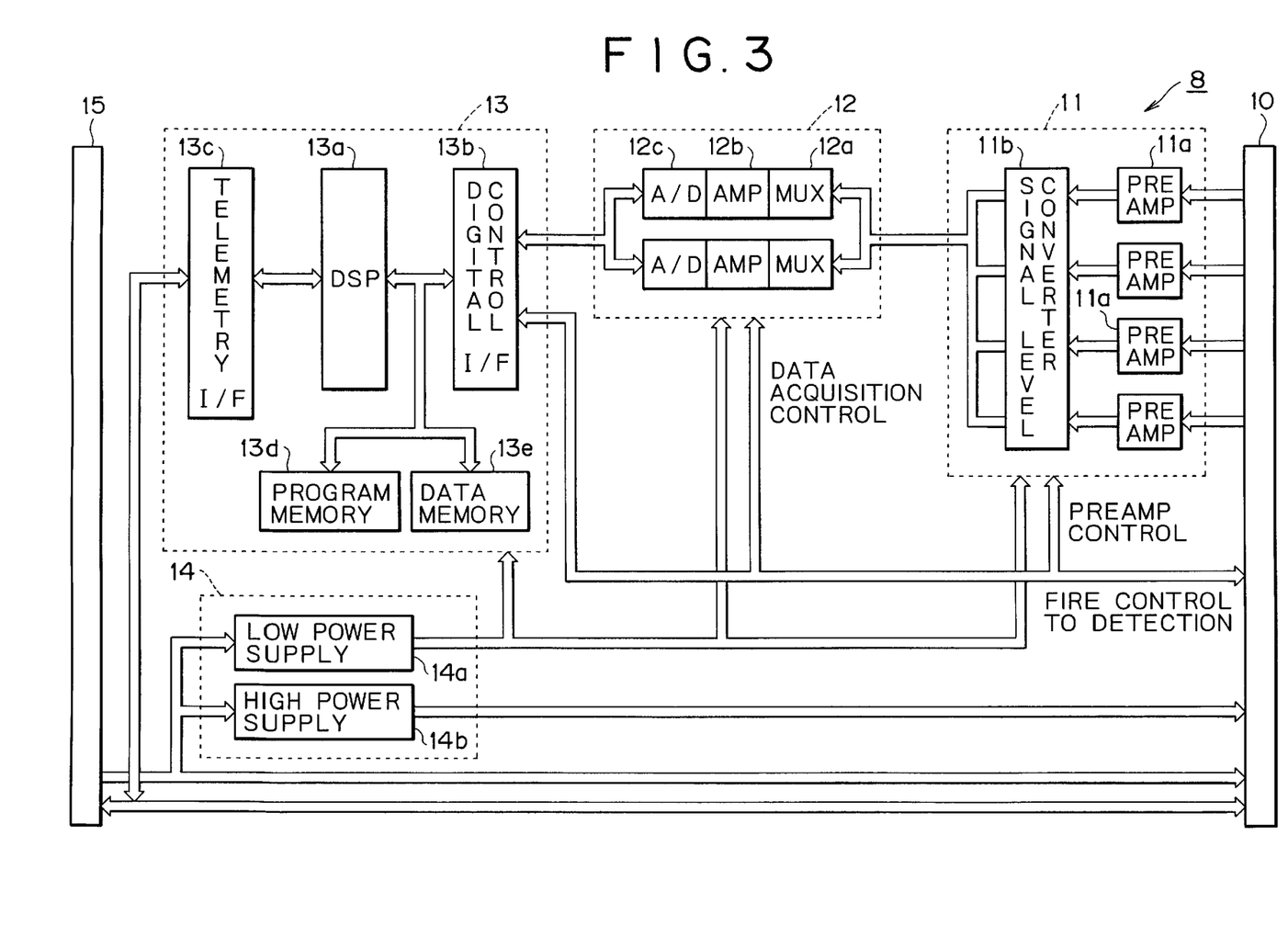
FIG. 3 A schematic block diagram showing one embodiment of a downhole processing unit provided in the sonic logging downhole tool of the present invention.

FIG. 3 is a block diagram showing a detailed structure of an embodiment of the downhole processing unit 8 inside the downhole tool 1. In FIG. 3, the downhole processing unit 8 includes a bottom connector 10 which is electrically connected to the sonic transmitter T and receivers R1 and R2 of the downhole tool 1. In the embodiment shown in FIG. 1, since the downhole tool 1 has a pair of receivers R1 and R2, these are connected to the bottom connector 10 and thus to respective corresponding preamplifiers 11*a* in a preamplifier section 11. Besides, the sonic transmitter T is also connected to the bottom connector 10 so that a fire control signal for firing (emitting) a sonic wave by energizing the sonic transmitter T is supplied to the sonic transmitter T and a high voltage for firing a sonic wave is supplied from a high voltage power supply 14*b* of a power supply section 14 to the sonic transmitter T. In addition, a detection signal of sonic wave firing time $T_0$ is supplied from the sonic transmitter T. In the preamplifier section 11 is also provided a signal level converter 11*b* which is connected to respective preamplifiers 11*a*. This signal level converter 11*b* may be used as a gain adjustment unit in the case where the downhole tool 1 has two channels.

The preamplifier section 11 is connected to a data acquisition section 12 through a but, which has two parallel paths, each including a multiplexer 12*a*, an amplifier (incorporating an anti-aliasing filter) 12*b*, and an analog-to-digital converter 12*c*. And, the data acquisition section 12 is connected to a control section 13 through a bus. The control section 13 includes a digital signal processor (DSP) 13*a*, a digital control interface 13*b*, a telemetry interface 13*c*, a program memory 13*d* and a data memory 13*e*, which are connected by buses each other with the DSP 13*a* at the center. In this embodiment, although use is made of ADSP-2101 commercially available from Analog Devices, Inc. for the DSP 13*a*, the present invention should not be limited only to the use of such a specific processor and use may also be made of any other general purpose microprocessors, micro-controllers or the like. The program memory 13*d* may be constructed by one or more of common non-volatile memories, such as ROM, PROM, EPROM and EEPROM. In particular, it should be noted that a sonic logging routine (e.g., Digital First Arrival Detection, or simply DFDA) for implementing various unique sonic logging functions of the present invention, which will be described in detail later, is stored in this program memory 13*d*. That is, detection signals from the receivers R1 and R2 are digitized by the A/D converter 12*c* and the resulting digital waveforms are stored in the data memory 13*e*, so that it is possible for the DSP 13*a* to process the digital waveforms stored in the data memory 13*e* in accordance with a sonic logging program stored in the program memory 13*d* to thereby determine the arrival time, amplitude or the like of the first P wave. It is also to be noted that the data memory 13*e* is comprised of a RAM for storing working data. The digital control interface 13*b* is particularly in charge of timing and controls the timing in operation of preamplifier section 11, data acquisition section 12 and sonic transmitter T. In addition, it is to be noted that, as an alternative embodiment of the present invention, the processor 13*a* and program memory 13*d* may be constructed in the form of firmware, such as logic gates, in place of a microprocessor.

The control section 13 is connected to a top connector 15 through a bus and the top connector 15 is connected to a telemetry cartridge (not shown) which, in turn, is connected to one end of the logging cable 2. Thus, the DSP 13*a* can transmit or receive data to or from the ground surface processing apparatus 3 by way of telemetry communication through the logging cable 2. In addition, a low voltage power supply 14*a* is provided in the power supply section 14 for supplying power to the preamplifier section 11, data acquisition section 12 and control section 13.

Figure 4:
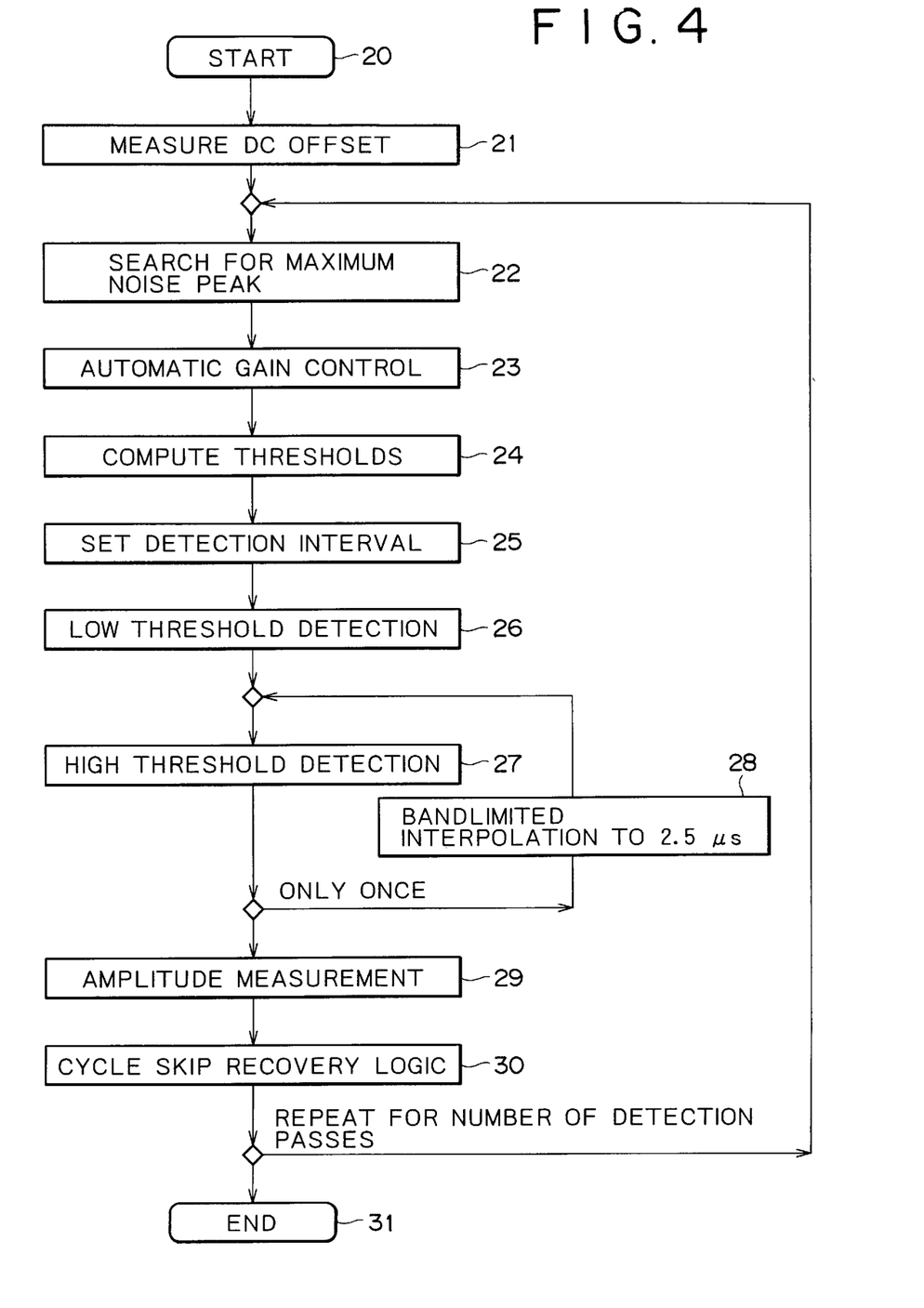
FIG. 4 A flow chart showing a detection routine based on one embodiment of a sonic logging method of the present invention.

Now, referring to FIGS. 4 through 11, a unique downhole sonic logging function and method of the present invention will be described in detail below. FIG. 4 illustrates a flow chart of the DFAD (Digital First Arrival Detection) program for determining the arrival time and the amplitude at downhole, i.e., inside a borehole, among the sonic logging program of the present invention stored in the program memory 13*d* shown in FIG. 3. It is to be noted that the DFAD routine shown in FIG. 4 is only a portion of the sonic logging of the present invention. That is, a downhole sonic logging sequence of the present invention includes basically the following four routines.

(1) Sonic Transmitter Activation Routine
(2) Data Acquisition and Digitization Routine
(3) DFAD Routine
(4) Telemetry transmission of DFAD Results to Ground Surface Processing Apparatus That is, in accordance with the downhole sonic logging sequence of the present invention, in the first place, in routine (1), the DSP 13a supplies a command for emitting a sonic wave to the sonic transmitter T according to the sonic logging program stored in the program memory 13d. Then, in routine (2), the DSP 13a detects sonic fire time $T_0$ and samples detection signals from the receivers $R'$ and R2 at a predetermined sampling interval (e.g., 10 micro-seconds), and has them digitized by the A/D converter 12c. The resulting digital waveform is stored in to the data memory 13e. It is to be noted that also in these routines (1) and (2), the DFAD routine is called as desired to use the data stored in the DFAD. Then, it enters into the flow of DFAD routine (FIG. 4), in which the digital waveform stored in the data memory 13e is processed to thereby determine the arrival time and/or amplitude regarding the first P wave in the digital waveform. And, then, it enters into routine (4), where the arrival time and/or amplitude thus determined are set into a telemetry frame, which, in turn, is transmitted to the ground surface processing apparatus 3 through the telemetry interface 13c or set in a stand-by state until the telemetry frame becomes full. The above-described downhole sonic logging sequence is repetitively carried out at different depths in the borehole 4 while moving the downhole tool 1 along the borehole 4 to thereby obtain a log along the longitudinal direction of the borehole 4.

Now, with reference to the flow chart of FIG. 4, individual routines for determining the arrival time and the amplitude of the first P wave from a digital waveform in the DFAD routine will be described in detail below.

As described above, once a digital waveform, which has been obtained by sampling with a predetermined gain and a predetermined sampling interval (e.g., 10 micro-seconds) after firing of a sonic wave and digitizing the sampled data (e.g., each sample being a 16bit signed integer value), is stored into the data memory 13e, the DSP 13a, at step 20 of FIG. 4, calls the DFAD routine stored in the program memory 13d.

Although not shown in the flow chart of FIG. 4, in the present embodiment, at the start of the DFAD it is first determined whether a digital waveform is to be inverted or not depending on the kind of borehole 4. That is, as described before, the borehole, i.e., open type without a casing, as shown in FIG. 1 or a cased borehole, i.e., clad type with the wall surface of borehole 4 being clad with a cylindrical casing. Thus, depending on whether the borehole 4 is either of these two types, the waveform pattern of a detected signal differs and thus its processing also differs. In the case of an open type borehole, mainly, the arrival time of the first P wave which has propagated through the ground formation along the borehole and has been detected by the respective receivers is determined and then based on the arrival time thus determined the propagation speed of a sonic wave, or its inverse of slowness, is calculated. Such parameters as the propagation speed of sonic wave and the slowness are related to the structure of an underground formation, so that such an underground formation structure (e.g., existence of oil or the like) can be analyzed by mapping these parameters along the longitudinal direction of a borehole. On the other hand, in the case of a casing type borehole, mainly, the amplitude of the first P wave, which has propagated through the casing, is determined and then based on the magnitude of the amplitude the bond strength (bond index) or the degree of cementing between the casing and the ground formation is evaluated. That is, since the higher the bond strength between the casing and its surrounding ground formation, the more leakage of the sonic energy to the surrounding ground formation, the amplitude of the first P wave which is detected by the receiver R becomes smaller.

Figure 5A:
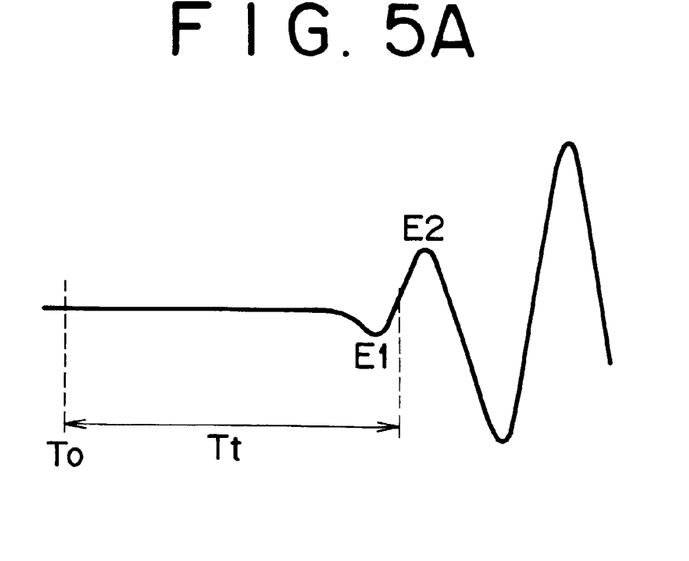
Figure 5B:
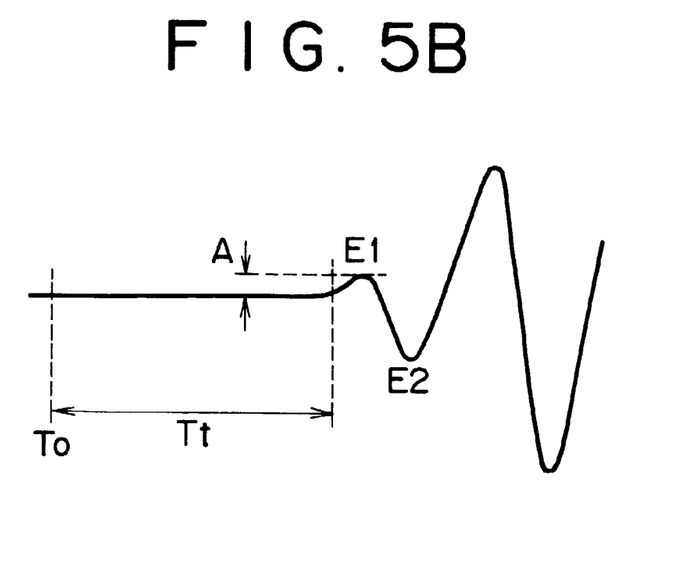

Now, as shown in FIG. 5(a), in the case of logging with an open type borehole, since it is common to determine the arrival time T using the second peak E2 rather than the first peak E1 of P wave, the polarity of the detected digital waveform is inverted. It is to be noted that although the digital waveform, in fact, has individual discrete data values spaced apart from one another at the sampling interval, it is shown as a smooth and continuous curve in FIG. 5 as a matter of convenience. As explained before, $T_0$ indicates the sonic wave firing time. On the other hand, as shown in FIG. 5(b), in the case of logging with a casing type borehole, since it is common to determine amplitude A using the first peak E1, the polarity of the digital waveform in this case is not inverted. Since the second peak E2 is opposite in polarity to the first peak E1, when the present DFAD routine is to be used in both of open type and casing type boreholes, it is necessary to invert the polarity of the data of a digital waveform when determining the arrival time T using the second peak E2. And, in this manner, in the case when processing is carried out with the DFAD routine by inverting the polarity of the data of a digital waveform, it is necessary to reinvert the data of the digital waveform after the processing with the DFAD routine so as to return to the original condition. It is to be noted that, in the present embodiment, since it is so structured to determine the arrival time T using the second peak E2 in logging with an open type borehole, it is necessary to invert the polarity of a digital waveform; however, if it is so structured to determine the arrival time T using the first peak E1 even in the case of an open type borehole, then it is, of course, not necessary to invert the polarity of a digital waveform.

Figure 7A:
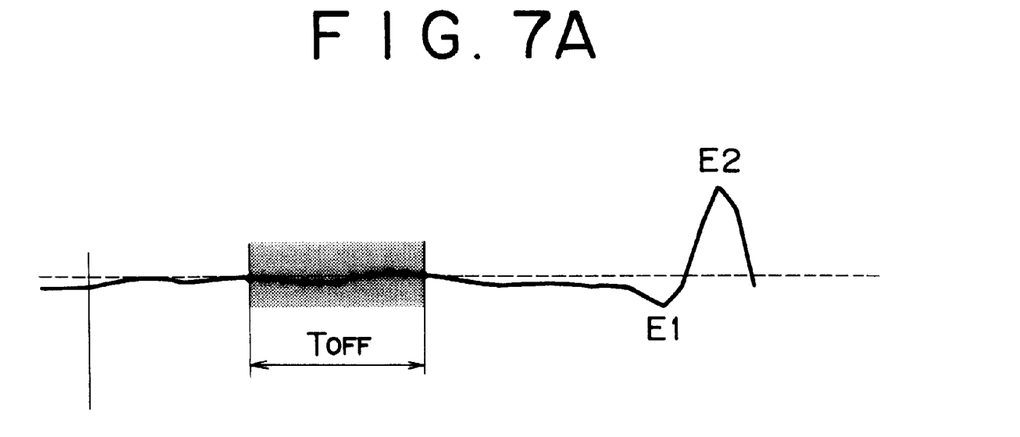

Then, as shown by step 21 of FIG. 4, DC offset measurement is carried out. This step is to establish the zero level of the base line of a waveform, i.e., the detection level under the condition in which no sonic wave has yet arrived at the detector R. In accordance with the present invention, a digital waveform is obtained by digitizing a detection signal by the A/D converter 12c inside the downhole tool 1, but the base line of the digital waveform does not necessarily agree with the zero level in the output of D/A converter 12c precisely. In particular, in this embodiment, use is made of a 16bit ADC (or A/D converter) as the A/D converter 12c, in which case such a difference is particularly noticeable. Thus, in order to take into consideration a difference between the zero level in the output of A/D converter 12c and th base line of the digital waveform, such a difference needs to be measured as a D.C. offset. As shown in FIG. 7(a), a D.C. offset measuring time period $T_{OFF}$ may be set at an arbitrary location of the base line portion of a digital waveform, but it must be set prior to the start of an arrival time detection period. In the example shown in FIG. 7(a), the D.C. offset measuring time period $T_{OFF}$ is set to be 100 micro seconds and the sampling interval is set at 10 micro seconds, so that there are shown eleven sampled data points. The D.C. offset is determined by calculating the average of these data points. It is to be noted that, as will be described later, the D.C. offset thus obtained is used for adjusting the location of the threshold to be used for determining arrival time Tt and also for correcting the measured value of the peak amplitude.

Figure 7B:
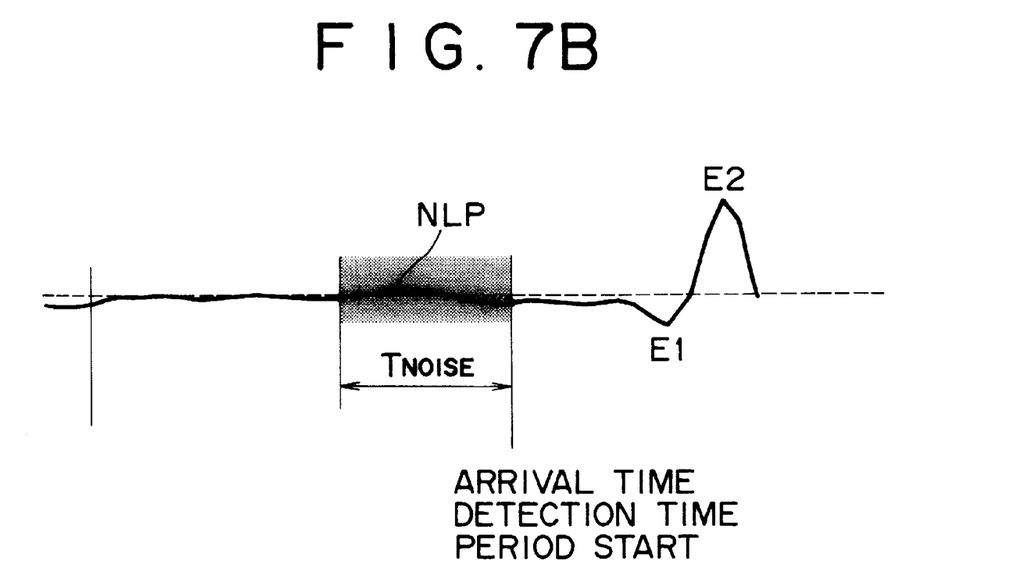

Then, noise measurement is carried out at step 22 of FIG. 4. In this noise measurement, the amplitude of the maximum positive noise peak in the base line of a digital waveform up to the start of the arrival time detection time period is determined. The maximum noise amplitude thus determined is used for setting the noise level of the amplitude of the first P wave which is to be determined later and also for evaluating the amplitude of the P wave thus determined. Preferably, for example, with intermediate and high noise thresholds set, the maximum noise amplitude thus determined is classified by determining whether it is at a low noise level, intermediate noise level or high noise level and then it is used for evaluating the result obtained by this routine at evaluation step 30 which is the last step in the routine. In the embodiment shown in FIG. 7(b), the noise measurement is set such that a noise detection period $T_{NOISE}$ terminates at the start of the arrival time detection time period, and since there are eleven sampling points at the interval of 10 microseconds, it is set at 100 micro seconds. And, in noise measurement, the maximum positive peak NLP in this noise detection time period is determined. In this case, the noise peak is determined, for example, by finding the maxim positive amplitude whose preceding and following adjacent sampling points are both smaller in amplitude. The noise detection period may be set at an arbitrary time period at an arbitrary base line position depending on various conditions as long as it remains prior to the start of the arrival time detection time period.

Then, at step 23 of FIG. 4, an automatic gain control routine is carried out. In the automatic gain control routine, as shown in FIG. 5(a), in detecting arrival time Tt of the first P wave, an intersecting point of the curve directed toward positive peak E2 of the first P wave with a predetermined threshold is determined and the arrival time is determined by the time from the sonic wave firing time $T_0$ to the intersection point. The reason why the arrival time is determined by using an intersecting point with a selected threshold rather than the base line of a digital waveform, or the zero cross with the zero level, is because, as described before, the base line of a digital waveform includes noise as well as D.C. offset, an error may occur if use is made of the zero cross with the base line of a digital waveform. Thus, it is so structured that, in view of the detected noise and D.C. offset, a threshold level is determined and an intersecting point with this threshold is detected to determine arrival time Tt. Thus, such a threshold is determined as a predetermined ratio relative to the amplitude of peak E2 of first P wave. If the threshold level to be used for determining arrival time Tt is defined as a predetermined ratio relative to peak E2 in this manner, in the case where the amplitude value of peak E2 of the next digital waveform differs from the amplitude value of peak E2 of the preceding digital waveform, it becomes necessary to adjust the threshold level used for peak E2 of the preceding digital waveform when arrival time Tt is to be determined for the preceding digital waveform. The automatic gain control, for this reason, determines a detection gain to be used for detection processing and adjusts the threshold level using the detection gain for each digital waveform, thereby securing the determination of arrival time Tt using a threshold level which is determined with a predetermined ratio relative to peak E2 at all times.

Figure 6A:
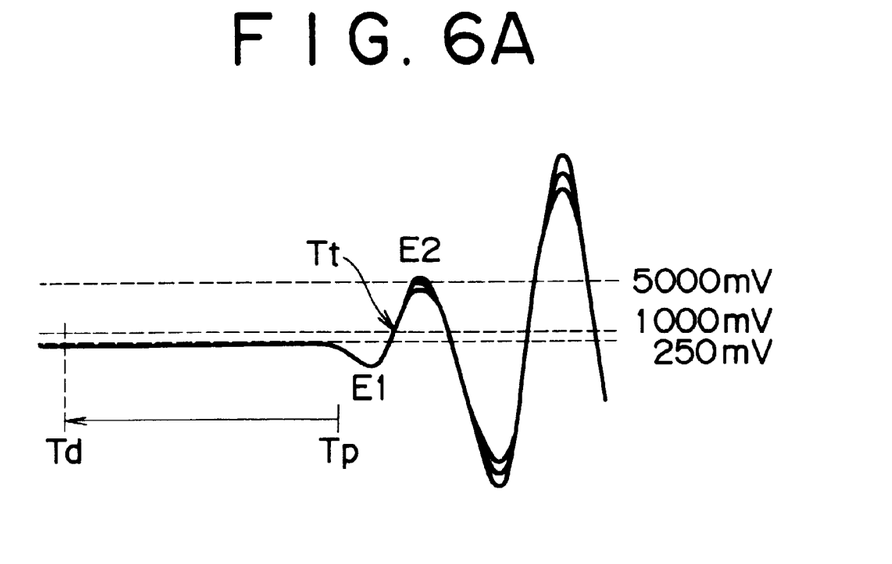
Figure 6B:
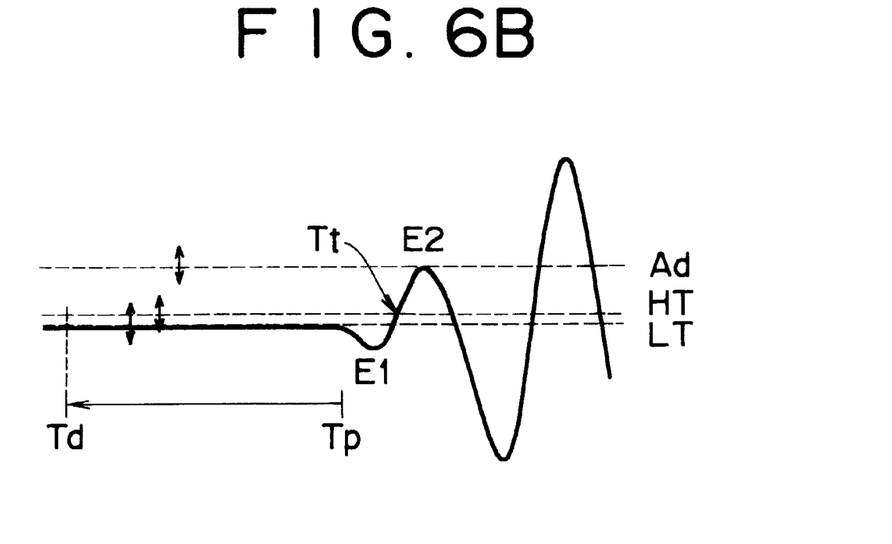

What is described in the preceding paragraph will be described more in detail with reference to FIGS. 6(a) and (b). FIG. 6(a) illustrates the condition in which arrival time Tt is determined using a threshold level in the prior art analog sonic logging. In this case, when a sonic wave is detected by a downhole tool, its detection signal is transmitted to a ground surface processing apparatus by way of telemetry communication so that the determination of the arrival time is carried out by the ground surface processing apparatus. Thus, the waveform shown in FIG. 6(a) is a continuous analog waveform. Incidentally, Td is detection start time for the current arrival time detection and Tp is the arrival time which has been determined by the preceding arrival time detection processing. An arrow directed from Tp toward Td indicates the fact that start time Td of current detection time period is set earlier than the arrival time Tp, which has been determined by the preceding processing, by an amount of time, which has been previously selected or is determined by carrying out a predetermined process. Tt is the arrival time which has been determined by the current processing.

In FIG. 6(a), there is shown the case in which the gain control is carried out to maintain the amplitude of peak E2 at 5,000 mV through the variable gain control in an analog detection system. It is shown that two thresholds, i.e., high threshold of 1,000 mV and low threshold of 250 mV, are set. Thus, even if peak E2 of the next waveform has an amplitude value which differs from that of the peak E2 of the preceding waveform, the threshold level, which has been set once, does not vary, so that the detected arrival time and the amplitude value of peak E2 differ in value from waveform to waveform.

On the other hand, FIG. 6(b) shows the detection principle based on one embodiment of the present invention. Although FIG. 6(b) shows a detection signal by a continuous line for the matter of convenience, it is to be noted that this line, in fact, is a collection of discrete sample points since it is a digital waveform. In FIG. 6(b), Ad is a desired peak amplitude of peak E2, HT is a high threshold and LT is a low threshold. It is to be noted that desired peak amplitude Ad is an amplitude for which the automatic gain control desires as a peak, and the detection gain for the next detection is adjusted based on the current detection gain, and a ratio between the preceding Ad and the preceding amplitude. The remaining parameters have the same meaning as those of FIG. 6(a). In accordance with the present invention, since processing is carried out within a downhole tool, it is impossible for the operator to control the gain of the amplifier. In addition, at the downhole processing unit 8, a digital waveform is sampled at a predetermined gain. Thus, in this case, if the threshold level is fixed at a constant level, the ratio of peak E2 to amplitude Ad of each waveform varies. Under the circumstances, in order to maintain the levels of thresholds HT and LT relative to peak E2 at predetermined ratioes for each of waveforms, the detection gain is calculated for each of the waveforms based on the amplitude of detected E2. And, then, threshold levels HT and LT are set for each of the waveforms based on the detection gain thus calculated.

The reason why the detection gain is calculated in this manner is because, in processing a digital waveform, the arrival time and the amplitude value of peak E2 are determined using the detection gain which has been determined for the preceding waveform or which has been selected by the user in the case of the very first processing, and, then, the detection gain is modified to the current waveform based on these values. And, the current waveform is processed using the detection gain thus modified to thereby determine refined arrival time and amplitude value of peak E2. By repeating such a process twice, the arrival time and the amplitude value of peak E2 can be determined based on the detection gain of the current waveform. As described above, in the above-described embodiment, since thresholds HT and LT are determined at predetermined ratioes relative to peak E2 for each of the waveforms, it is necessary to determine the detection gain for each of the waveforms, and, for that purpose, a digital waveform is processed to determine the detection gain of that waveform in the automatic gain control routine. In a preferred embodiment, in the automatic gain control routine, maximum and minimum detection gains are set depending on the conditions, and it is determined to be a valid detection gain only when the calculated detection gain falls between them.

Then, at step 24 of FIG. 4, using the detection gain as calculated above, various threshold levels, including high and low threshold levels HT and LT, are calculated. For example, in one embodiment, (1) desired amplitude (100%), (2) low threshold (15%), (3) high threshold (20%), (4) intermediate noise threshold (4%) and (5) high noise threshold (40%) are calculated.

Then, at step 25 of FIG. 4, an arrival time detection time period for detecting arrival time Tt in a digital waveform is set. The arrival time detection time period is to determine to use which portion of a digital waveform for the detection of arrival time Tt. Such a detection time period can be set variably or at a fixed value for each of waveforms. In order to carry out the detection processing of arrival time Tt expeditiously and efficiently, it is desirable to set the detection time period at a location where arrival time Tt is likely to be present, i.e., such that the detection time period starts immediately before the vicinity of an intersection point with a threshold. For example, the detection time period for the current and next digital waveform is set based on the processed result of the preceding digital waveform, and, since it is not likely that the arrival time of the current digital waveform varies from the arrival time of the preceding digital waveform significantly, it is preferable to determine the start of the detection time period by going back over a predetermined time period based on the arrival time of the preceding digital waveform. In particular, in the case of an open type borehole, since the sonic wave which propagates through the underground formation is detected, it is effective to set the detection time period varyingly for each of the digital waveforms. On the other hand, in the case of a casing type borehole, since the arrival time remains the same for the size of a given casing, it is possible to use a fixed detection time period.

Figure 8:
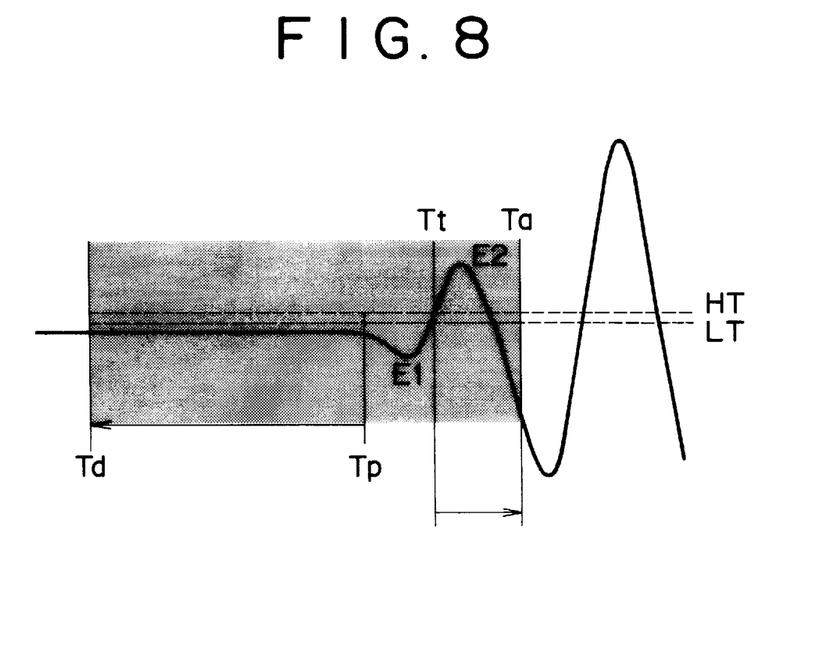
FIG. 8 An illustration showing the arrival time detection time period start time and the peak amplitude measuring time period.
Figure 9:
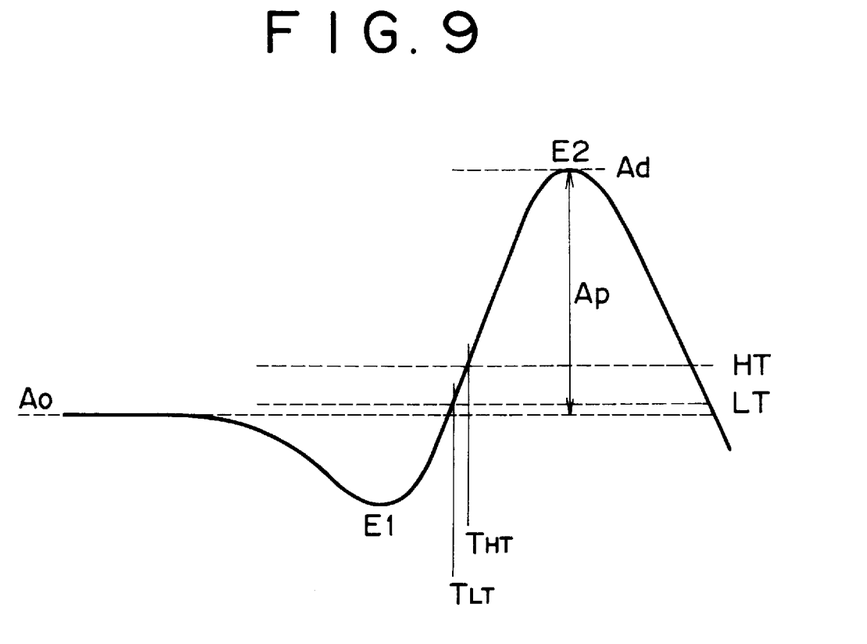
FIG. 9 An illustration showing the relation between the low and high threshold detection and the peak amplitude detection.

In FIG. 8, Td is the start time of arrival time detection time period and it is set by going back over a predetermined time period from the arrival time Tp which has been determined at the preceding processing, and it is shown that the arrival time Tt is set at a positive going intersection point of a digital waveform with the high threshold HT for the first time and the detection time period terminates there. Upon determination of arrival time Tt, an amplitude measuring time period for peak E2 starts at step 29 of FIG. 4 and the amplitude measuring time period ends at a predetermined time Ta. In addition, FIG. 9 shows that a digital waveform is at first at output zero level $A_0$ of the A/D converter and it changes to the first positive peak E2. And, the point in time when the digital waveform intersects with the low threshold LT for the first time is indicated as $T_{LT}$ and the point in time when the digital waveform intersects with the high threshold HT for the first time is indicated as $T_{HT}$. The time $T_{HT}$ becomes the arrival time Tt determined for this waveform. In addition, the amplitude value of peak E2 is indicated by Ad.

Figure 10A:
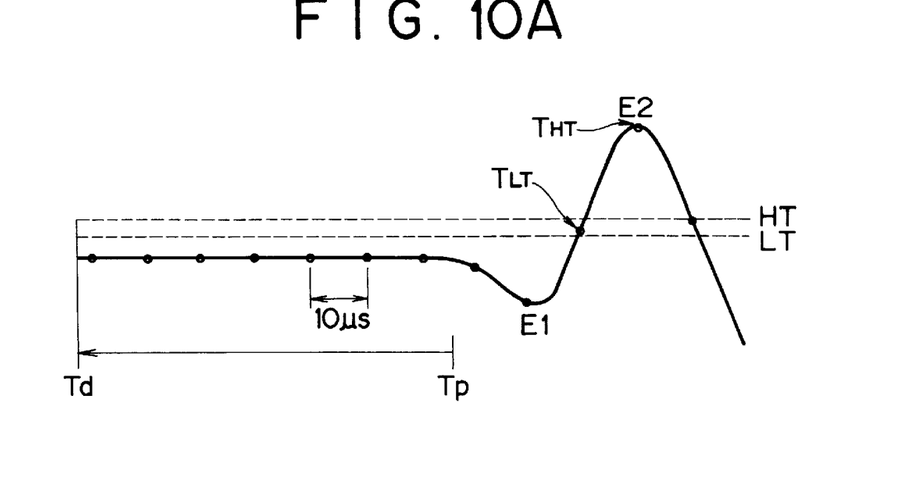

Then, at steps 26 through 28 of FIG. 4, a low and high threshold detection routine is carried out. This routine can be considered fundamentally as divided into two stages. That is, (1) low and high threshold detection using a sampled waveform data and (2) final high threshold detection by interpolation of waveform data. In the first stage, as shown in FIG. 10(*a*), digital waveform sample points sampled at an interval of 10 micro seconds are scanned in a detection time period set as described above to thereby find the first sample points which have intersected the low and high thresholds LT and HT for the first time in the positive direction, respectively. In the present case, it is the sample point $T_{LT}$ that has intersected the low threshold LT for the first time in the positive direction and it is the sample point $T_{HT}$ that has intersected the high threshold HT for the first time in the positive direction. Thus, according to the processing of the first stage, the sample point $T_{HT}$ is tentatively determined as the arrival time Tt. This is because, in this embodiment, the arrival time is defined as a point in time when the first P wave intersects with the high threshold HT for the first time in the positive direction. Thus, if the arrival time is defined differently, a specific method for determining the arrival time may differ. In this manner, although the sample point $T_{HT}$ is tentatively determined as the arrival time of this digital waveform as a result of the first stage of this routine, there may be a case in which the sample point $T_{HT}$ is, in fact, located far apart from the high threshold HT. This is because the respective sample points are spaced apart over the sampling interval of 10 micro seconds at data acquisition. Thus, even if the sampling interval is sufficiently fine or the sampling interval is relatively coarse but the sample point $T_{HT}$ which has been determined by the first stage intersects with the high threshold HT with a sufficient accuracy, this routine can be terminated at the end of the first stage.

Figure 10B:
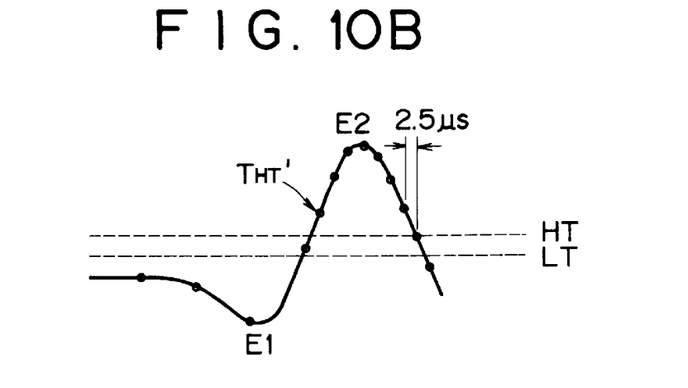
Figure 10C:
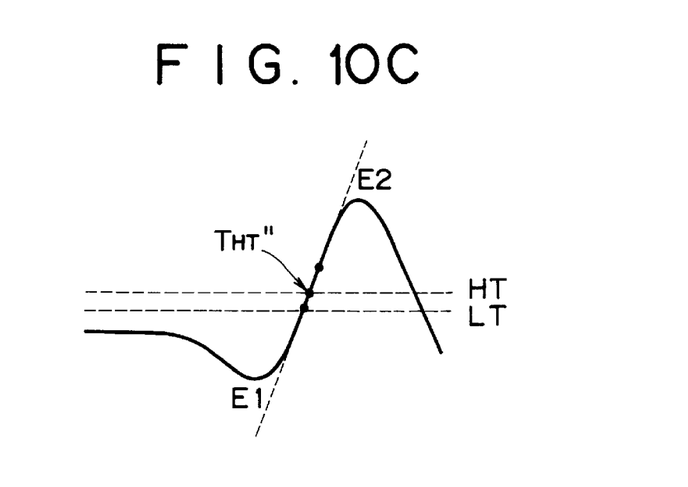

This routine allows to determine the arrival time at high accuracy by accurately estimating an intersection point between the digital waveform and the high threshold HT by carrying out an interpolation process at the second stage. This second stage corresponds to the loop including step 28 in FIG. 4. In the present embodiment, this interpolation process is carried out also in two stages. That is, in the first place, band limited interpolation shown in FIG. 10(*b*) is carried out and then linear interpolation shown in FIG. 10(*c*) is carried out. As shown in FIG. 10(*b*), the band limited interpolation is applied from the sample point (in this case, sample point $T_{LT}$) which is immediately preceding the sample point $T_{HT}$, which has been tentatively determined as arrival time Tt, to thereby find interpolation points at an interval of 2.5 micro seconds between the sample points at 10 micro seconds in the digital waveform. In this example, since the sampling interval of a digital waveform is 10 micro seconds, three interpolation points are found between the two adjacent sample points at 10 micro seconds. Then, processing to find a point (sample point or interpolation point) which intersects the high threshold HT in the first place in the positive direction is carried out for both the sample and interpolation points. In this example, interpolation point $T_{HT}$ is found as a result of such processing so that this interpolation point $T_{HT}'$ is tentatively determined as refined arrival time Tt. Then, as shown in FIG. 10(*c*), two points (in this example, sample point $T_{LT}$ and interpolation point $T_{HT}'$) which are closest to the intersection with the high threshold HT are found, and linear interpolation is carried out for these two points to calculate an intersection point $T_{HT}''$ with the high threshold HT, which is then determined as the final arrival time Tt. As described above, in the present embodiment, the interpolation processing is carried out in two stages, i.e., first stage with the band limited interpolation and the second stage with the linear interpolation, but it is, of course, also possible to provide a structure which carries out only the band limited interpolation or linear interpolation depending on the application conditions.

Now, the above-described band limited interpolation is well known as a method for resampling or determining interpolation points between sample points at a higher resolution than the sample points which have been obtained for the first time by digitization. In this respect, reference should, for example, be made to A. V. Oppenheim and R. W. Shafter, "Reconstruction of a Bandlimited Signal from its Samples", Discrete Time Signal Processing, Inglewood cliff, N.J., U.S.A., Prentice Hall, 1989. In the bank limited interpolation, use is made of sample points of a waveform themselves for reconstructing a waveform signal between the sample points. That is, interpolated amplitude y(t) at a given point in a waveform at time t can be calculated by the following band limited interpolation equation.

$$y(t) = \sum_{i=0}^{n} y_i \frac{\sin(\pi(t-t_i)/T)}{\pi(t-t_i)/T}$$

where,
- $y_i$: amplitude of ith waveform sample,
- $t_i$: time of ith waveform sample,
- T: sampling interval,
- n: number of waveform samples.

However, the above-described band limited equation requires to use all of waveform samples and also to apply a filter same in length as the waveform. In order to avoid the calculation of such an exorbitant amount of data, in a preferred embodiment of the present invention, use is made of modified band limited interpolation in which a shorter filter length is used and a fewer number of waveform samples around a point to be interpolated can be used. This modified band limited interpolation equation is expressed as follows:

$$y(t) = \sum_{i=i_t-\frac{f-1}{2}}^{i_t-\frac{f-1}{2}} y_i \frac{\sin(\pi(t-t_i)/T)}{\pi(i-t_i)/T}$$

where,
- $i_t$: time index closest to t,
- f: filter length in sample number, odd number, Thus, in the preferred embodiment of the present invention, use is made of this modified band limited interpolation equation to relax the constraints in calculation and increase the processing speed.

Then, at step 29 of FIG. 4, an amplitude measuring process is carried out. In the amplitude measuring process, amplitude Ap of the first arrived peak is measured. This amplitude measurement is carried out after the detection of the high threshold. The amplitude thus measured is used in the automatic gain control routine, which determines the high and low thresholds HT and LT as described before. In the preferred embodiment of the present invention, this peak amplitude is determined from waveform interpolation points interpolated at a sampling interval which is finer than the sampling interval at the time of data acquisition. Besides, in particular, in the case of a casing type borehole, in determining the final amplitude, use is made of a quadratic interpolation equation which is approximated by a parabolic line.

A peak amplitude measuring time period is set prior to the detection of arrival time when the arrival time detection time period is set. The peak amplitude measuring time period is from Td to Ta in FIG. 8. The measurement of peak amplitude can be carried out independently of or at the same time with the detection of low and high thresholds, so that, even if the detection of low and high thresholds is not carried out, the detection of peak amplitude can be carried out. On the other hand, in the case where the high threshold is detected at time Tt, time Ta is varied such that the peak amplitude measuring time period terminates after a predetermined time period after time Tt. The digital waveform samples within the peak amplitude measuring time period are scanned to find the largest peak. If the amplitudes of both of the adjacent preceding and following sample points (left and right in the illustrated example) are smaller than the amplitude of a current sample point, the current sample point is extracted as a peak and the peak having the largest amplitude among the peaks thus extracted becomes peak amplitude Ap. The amplitude measurement is adjusted for D.C. offset $A_0$. It is important to set the termination time Ta such that, if an intersection with the high threshold has been detected, any following P waves which follows the first P wave are not detected. If an intersection with the high threshold has been detected, the scanning of the sampled data points can be stopped and scanning of interpolation points between the sampled data points can be initiated.

Figure 11:
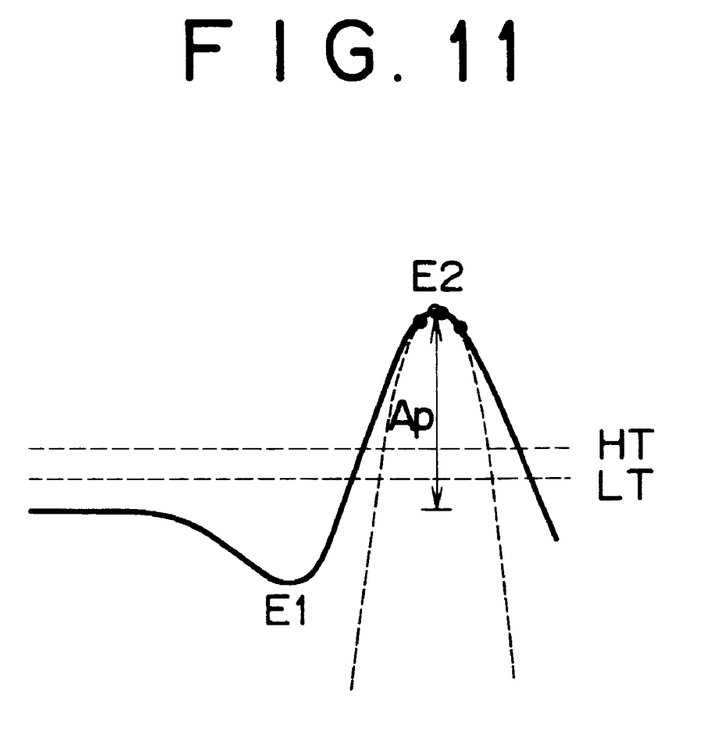
FIG. 11 An illustration showing how the peak amplitude is determined by the quadratic interpolation using a parabolic line.

That is, in accordance with the preferred embodiment of the present invention for carrying out amplitude measurement, after finding the interpolation point $T_{HT}'$ by carrying out the high threshold detection using the digital waveform samples shown in FIG. 10(*a*) and the high threshold detection by the band limited interpolation shown in FIG. 10(*b*), the time after 25 micro seconds from that interpolation point is set as the termination point Ta of the peak amplitude measuring time period. And, among the sample points and interpolation points at an interval of 2.5 micro seconds in the peak amplitude measuring time period, the point having the largest amplitude is determined as peak amplitude Ap. If the peak amplitude detection is to be carried out following the detection of high and low thresholds, it is of course possible to carry out the peak amplitude detection processing using the data of FIG. 10(*b*). In particular, in the case of a casing type borehole, as shown in FIG. 11, more refined final peak amplitude Ap can be determined by carrying out quadratic interpolation with parabolic approximation using the three points near the peak. Since the amplitude measurement without the quadratic interpolation is normally sufficient for the automatic gain control routine, the determination of peak amplitude using the quadratic interpolation is carried out only in the case of a casing type borehole. However, if precision is required in the automatic gain control routine, the determination of peak amplitude using the quadratic interpolation can also be carried out.

Now, the error check routine called cycle skip recovery logic at step 30 of FIG. 4 will be described below. In this step, after determining the arrive time Tt by the high threshold detection process, it is determined whether it is output as the arrival time or not. This error check routine determines whether the high threshold detection process has produced the arrival time incorrectly or not. If it has been determined that the arrival time has been produced incorrectly, the arrival time which has been obtained in the previous detection process is output again. Moreover, this error check routine determines whether it is necessary to override the automatic gain control routine and the detection time period control routine if the detection process is not believed to be correct.

In accordance with a preferred embodiment of the present invention, as described previously, in the case where the noise detected during the noise detection for the base line of a digital waveform is classified into three kinds of low, intermediate and high noises, if the noise is classified as the low noise and the detection result by the low and high threshold detection is consistent, then the detection result is determined to be valid by this error check routine. On the other hand, if there is no consistency for the detection result by the low and high threshold detection or the noise is classified as the intermediate or high noise, then this error check routing determines this detection result to be invalid. In the above-described embodiment, the interpolation processing is carried out in the case of the high threshold detection and no interpolation processing is carried out in the case of the low threshold detection. This is because, the resolution of 10 micro seconds is normally sufficient for the low threshold detection. However, if a higher resolution is required also in the low threshold detection, it is of course possible to carry out similar interpolation processing also in the low threshold detection.

Then, as shown in FIG. 4, upon completion of error check step 30, the entire detection sequence shown in FIG. 4 is repetitively carried out for the same digital waveform and at minimum the detection sequence is repeated twice for the same digital waveform. This is because, in the case where the detection sequence of FIG. 4 is carried out for the first time for a specific digital waveform, the detection sequence is carried out using the values set by the user or the values obtained in the proceeding detection sequence, and in the case of carrying out the detection sequence for the second time, use may be made of the threshold set for the peak amplitude which has been obtained by carrying out the detection sequence for the first time for the specific digital waveform. Thus, although to carry out the entire sequence twice repetitively for the same digital waveform allows to significantly enhance the accuracy of the result obtained, to carry out the entire sequence three times is not necessary advantageous because of an increase in calculation time. However, it is true that the more the number of repetitions, the higher the reliability.

Although the specific modes of embodiment of the present invention have been described above, the present invention should not be limited only to these specific embodiments and various modifications can, of course, be made without deviating the technical scope of the invention.

Effects

In accordance with the present invention, digital processing is carried out at downhole and it is only necessary to transmit necessary minimum amount of data to a ground surface processing apparatus by way of telemetry communication, so that the possibility of occurrence of errors is minimized. In addition, since the bandwidth of telemetry communication is relaxed, the conditions for telemetry communication are relaxed and a reduction in cost is possible. Besides, since the time for telemetry communication is minimized, the sonic logging operation is increased in speed.

What is claimed is:

1. A sonic logging method for determining characteristics of a formation through which a borehole passes using a downhole tool which is located in the borehole so as to be moveable up and down and coupled to ground surface processing apparatus by means of a logging cable, the downhole tool including: (i) at least one sonic wave generator and at least once receiver spaced apart from each other; and (ii) a downhole processing device operatively coupled to the generator and receiver and also to the ground surface processing apparatus through the logging cable, the method comprising:

(a) locating the downhole tool in the borehole;

(b) generating a sonic wave signal with the at least one generator;

(c) receiving the sonic wave signal with the at least one generator;

(d) processing a received signal using the downhole processing device and determining an arrival time for the sonic wave signal at the receiver; and (e) transmitting the determined arrival time to the ground surface processing equipment through the logging cable.

2. A method as claimed in claim 1, wherein the step of processing the received signal comprises:

(i) setting an arrival time detection period;

(ii) identifying a point in the arrival time detection period at which the received signal first exceeds a predetermined threshold level; and (iii) determining the point as the arrival time.

3. A method as claimed in claim 2, wherein the step of processing the received signal comprises:

(i) setting an offset detection period earlier than the arrival time detection period;

(ii) detecting, during the offset detection period, any DC offset in the received signal baseline; and (iii) determining, from the determined offset, a zero level of the received signal.

4. A method as claimed in claim 2, wherein the step of processing the received signal comprises:

(i) setting a noise detection period earlier than the arrival time detection period;

(ii) detecting, during the noise detection period, any noise in the received signal baseline; and (iii) evaluating a reliability for the determined arrival time from the detected noise.

5. A method as claimed in claim 1, wherein the step of processing the received signal comprises:

(i) sampling the received signal at a predetermined sampling interval;

(ii) converting the sampling signal into a digital form;

(iii) storing the digital form in memory; and (iv) processing the digital form so as to determine the arrival time.

6. A method as claimed in claim 5, wherein the step of processing the digital form comprises:

(i) setting an arrival time detection period;

(ii) identifying a point in the arrival time detection period at which the digital form first exceeds a predetermined threshold level; and (iii) determining the point as the arrival time.

7. A method as claimed in claim 6, wherein the step of processing the digital form comprises:

(i) setting an offset detection period earlier than the arrival time detection period;

(ii) detecting, during the offset detection period, any DC offset in the digital form baseline; and (iii) determining, form the determined offset, a zero level of the digital form.

8. A method as claimed in claim 6, wherein the step of processing the digital form comprises:

(i) setting a noise detection period earlier than the arrival time detection period;

(ii) detecting, during the noise detection period, any noise in the digital form baseline; and (iii) evaluating a reliability for the determined arrival time from the detected noise.

9. A method as claimed in claim 6, wherein the step of identifying the point at which the digital form exceeds the threshold comprises:

(i) identifying a first sample point in the arrival time detection period at which the digital form first exceeds the predetermined threshold; and (ii) interpolating between the first sample point and a sample point immediately preceding the first sample point and identifying a point exceeding the threshold level at a time interval smaller than the sampling interval, which point is determined as the arrival time.

10. A method as claimed in claim 1, further comprising determining an amplitude for the received signal in the downhole processing device and transmitting this amplitude to the ground surface processing equipment.

11. A method as claimed in claim 10, wherein the step of processing the received signal comprises:

(i) determining a threshold for detecting arrival of a signal;

(ii) detecting a point at which the received signal exceeds the threshold;

(iii) identifying a largest amplitude in the received signal after the point at which the received signal exceeds the threshold; and (iv) adjusting the threshold to be a predetermined portion of the largest amplitude.

12. A method as claimed in claim 11, wherein the received signal is subsequently re-processed using the adjusted threshold to determine the arrival time by identifying a point at which the received signal exceeds the adjusted threshold for the first time.

13. A method as claimed in claim 5, further comprising determining an amplitude for the digital form in the downhole processing device and transmitting this amplitude to the ground surface processing equipment.

14. A method as claimed in claim 13, wherein the step of processing the received signal comprises:

(i) determining a threshold for detecting arrival of a signal;

(ii) detecting a point at which the digital form exceeds the threshold;

(iii) identifying a largest amplitude in the digital form after the point at which the received signal exceeds the threshold; and (iv) adjusting the threshold to be a predetermined portion of the largest amplitude.

15. A method as claimed in claim 14, wherein the digital form is subsequently re-processed using the adjusted threshold to determine the arrival time by identifying a point at which the digital form exceeds the adjusted threshold for the first time.

16. A sonic logging method for determining characteristics of a formation through which a borehole passes using a downhole tool which is located in the borehole so as to be moveable up and down and operatively coupled to ground surface processing apparatus, the downhole tool including: (i) at least one sonic wave generator and at least one receiver spaced apart from each other; and (ii) a downhole processing device operatively coupled to the generator and receiver and in communication with the ground surface processing apparatus, the method comprising:

(a) locating the downhole tool in the borehole;

(b) generating a sonic wave signal with the at least one generator;

(c) receiving the sonic wave signal with the at least one receiver;

(d) processing a received signal using the downhole processing device and determining an arrival time for the sonic wave signal at the receiver; and (e) transmitting the determined arrival time to the ground surface processing equipment.

17. A sonic logging downhole tool for determining characteristics of a formation through which a borehole passes, comprising:

(a) at least one sonic wave generator;

(b) at least one receiver capable of receiving the sonic wave after it has traveled through the formation;

(c) a control device for controlling the generation and reception of the sonic wave, the control device comprising:

(i) an analog-to-digital converter for digitizing a detection signal waveform from the at least one receiver at a predetermined sampling interval;

(ii) a first memory for storing the digitized waveform;

(iii) a second memory for storing a predetermined program for processing the stored digitized waveform; and (iv) a microprocessor capable of executing the program stored in the second memory so as to process the digitized waveform stored in the first memory to determine an arrival time of a sonic wave generated by the generator and received by the receiver.

18. A sonic logging system for determining characteristics of a formation through which a borehole passes, comprising a ground surface processing apparatus, and a downhole tool in communication with the ground surface processing apparatus and comprising:

(a) at least one sonic wave generator;

(b) at least one receiver capable of receiving the sonic wave after it has traveled through the formation;

(c) a control device for controlling the generation and reception of the sonic wave, the control device comprising:

(i) an analog-to-digital converter for digitizing a detection signal waveform from the at least one receiver at a predetermined sampling interval;

(ii) a first memory for storing the digitized waveform;

(iii) a second memory for storing a predetermined program for processing the stored digitized waveform; and (iv) a microprocessor capable of executing the program stored in the second memory so as to process the digitized waveform stored in the first memory to determine an arrival time of a sonic wave generated by the generator and received by the receiver.

* * * * *